United States Patent [19]

Hanaoka

[11] 4,208,869
[45] Jun. 24, 1980

[54] ILLUMINATION DEVICE FOR ELECTRONIC TIMEPIECE

[75] Inventor: Tadashi Hanaoka, Koganei, Japan

[73] Assignee: Citizen Watch Company Limited, Tokyo, Japan

[21] Appl. No.: 819,432

[22] Filed: Jul. 27, 1977

[30] Foreign Application Priority Data

| Jul. 31, 1976 | [JP] | Japan | 51/91810 |
| Jul. 31, 1976 | [JP] | Japan | 51/91811 |
| Aug. 24, 1976 | [JP] | Japan | 51/101017 |
| Aug. 24, 1976 | [JP] | Japan | 51/101018 |
| Sep. 3, 1976 | [JP] | Japan | 51/104991 |
| Sep. 25, 1976 | [JP] | Japan | 51/115054 |
| Mar. 3, 1977 | [JP] | Japan | 52/022200 |
| Mar. 8, 1977 | [JP] | Japan | 52/024420 |

[51] Int. Cl.$^2$ .................................. G04B 19/30
[52] U.S. Cl. ........................ 368/84; 350/150; 368/79; 368/67
[58] Field of Search ........... 350/150; 58/50 A, 50 R, 58/23 A, 23 BA, 23 R

[56] References Cited

U.S. PATENT DOCUMENTS

| 3,828,547 | 8/1974 | Fujita | 58/50 R |
| 3,864,905 | 2/1975 | Richardson | 58/50 R |

Primary Examiner—J. V. Truhe
Assistant Examiner—L. W. Pojunas, Jr.
Attorney, Agent, or Firm—Jordan and Hamburg

[57] ABSTRACT

An illumination device for an electronic timepiece equipped with an electro-optical display device and a battery as a power source, which comprises: an electro-luminescent sheet disposed at the lower surface of said electro-optical display device; a booster circuit for converting the battery voltage to an AC voltage; and an illumination switch for operating said booster circuit in response to the manipulation of an external control member; whereby said electro-optical display means is illuminated when said electro-luminescent sheet is rendered light emissive in response to manipulation of said illumination switch.

19 Claims, 38 Drawing Figures

(a)

(b)

(a)

(b)

(c)

ILLUMINATION DEVICE FOR ELECTRONIC TIMEPIECE

This invention relates to an improvement in illumination devices for an electronic timepiece equipped with an electro-optical display device.

Electronic wristwatches equipped with a liquid crystal display device or other electro-optical device of light receptive type were, in respect of display clarity when viewed in a darkened environment, inferior to wristwatches having an analog display or light-emitting display such as can be obtained through the use of light emitting diodes or the like. In an effort to improve upon this defect, incandescent lamps have recently come into general use for the purpose of providing illumination in wristwatches. This system, however, made it quiet difficult to reduce the thickness of a wristwatch since it was necessary to provide, below the lower surface of the liquid crystal cell, a space which would allow the transmission of the light rays emitted by the incandescent lamp. Furthermore, when viewing the display in daylight from an oblique angle, a double image of the display would appear since the reflective surface of the device was spaced apart from the surface of the liquid crystal cell. In addition, sufficient illumination could not be obtained owing to a non-uniformity in brightness across the liquid crystal display surface, this being the result of the shape of the light source itself which was either a point or linear source. Although it has been proposed to dispose at the back of the liquid crystal display element a reflective surface applied with a substance which exhibits a light-regenerative property or the ability to produce and emit its own light, the amount of light obtained is insufficient, and in some cases there is the danger of radioactivity. These illumination devices have therefore proved to be unacceptable.

It is, accordingly, an object of the present invention to eliminate the above-mentioned defects encountered in the prior art and provide a system through which sufficient illumination can be obtained by means of a slender, planar source of light. The present invention seeks to attain this object by disposing an electro-luminescent sheet (hereafter referred to as EL sheet) at the back of a liquid crystal display device and in parallel therewith, the EL sheet being rendered light emissive by means of an EL sheet driver circuit which is installed within a wristwatch and operated upon closure of an illumination switch controllable by an external control member provided on the case of the wristwatch.

It is another object of the present invention to minimize the effects of the electric field generated about the periphery of the electrodes of the EL sheet so that the EL sheet can be adhered to the back of the liquid crystal display device, and for the purpose of preventing malfunction of the timepiece circuitry which is comprised of the MOS-MOT components.

It is another object of the present invention to provide an illumination device for an electronic timepiece in which, using an EL sheet as the light emitting body, it is possible to obtain sufficient illumination while reducing the load on the timepiece battery by driving the EC sheet at a power of 1 to 2 milliwatts or less.

It is a further object of the invention to provide a compact, inexpensive booster circuit for efficiently boosting the voltage of a battery incorporated in a timepiece and applying this boosted voltage to an EL sheet for the purpose of rendering it light emissive.

In the accompanying drawings, in which: FIG. 1 is a cross-sectional view of a liquid crystal display device and one example an EL sheet forming part of an illumination device of the present invention;

Figure 6:
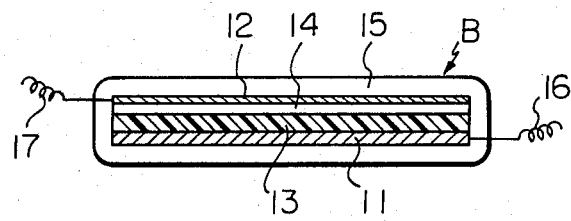
FIG. 6 is a cross-sectional view of another example of an EL sheet employed in the present invention.
Figure 7:
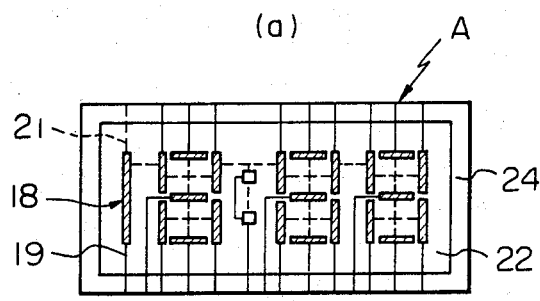
Figure 7:
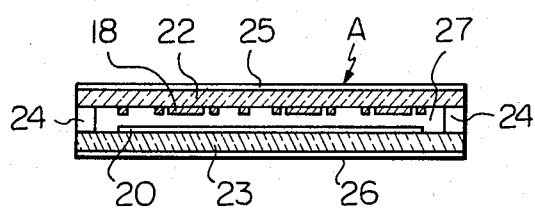
Figure 9:
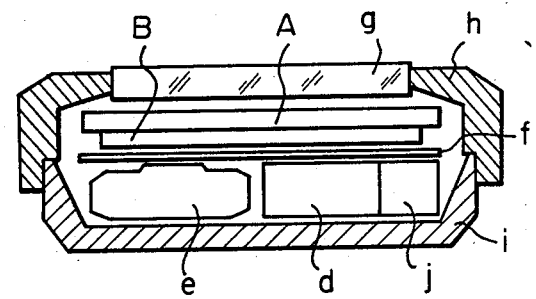
Figure 10:
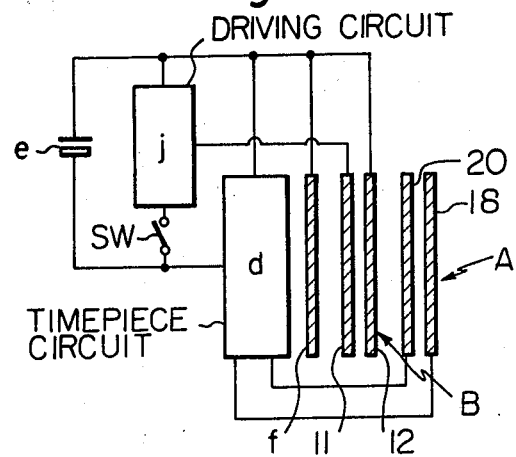
Figure 11:
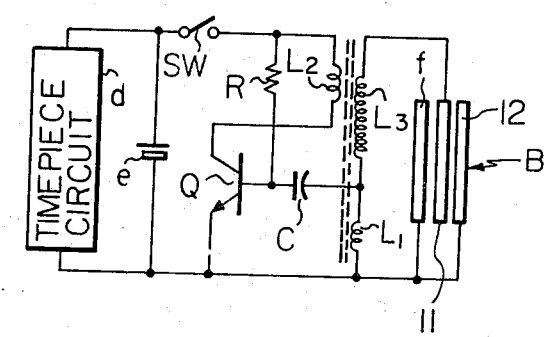
Figure 11:
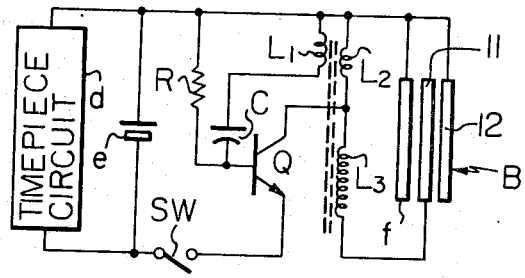
Figure 11:
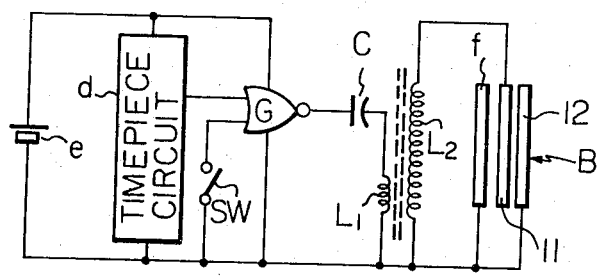
Figure 12:
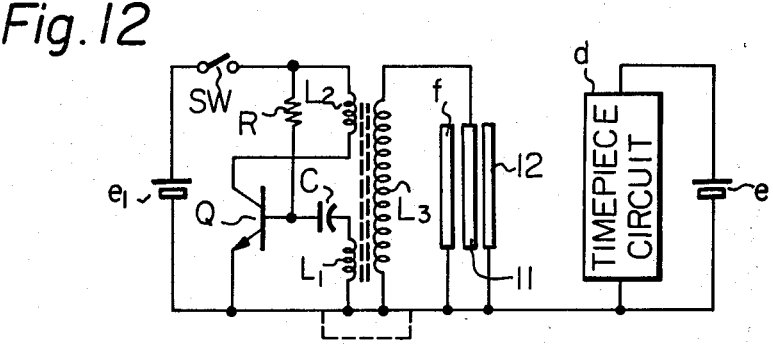
Figure 13:
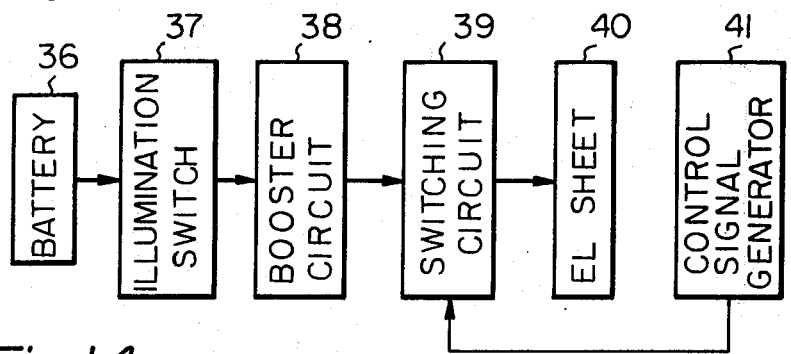
Figure 14:
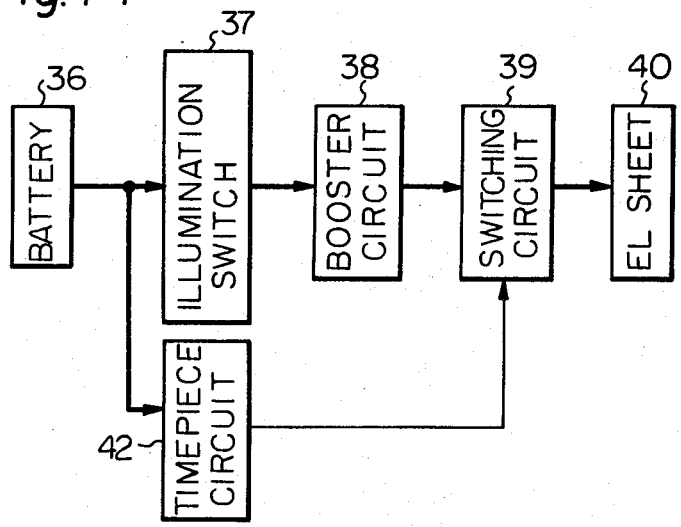
Figure 15:
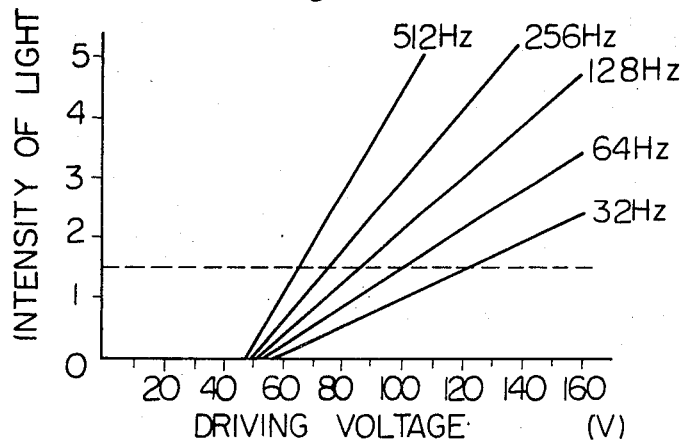
Figure 16:
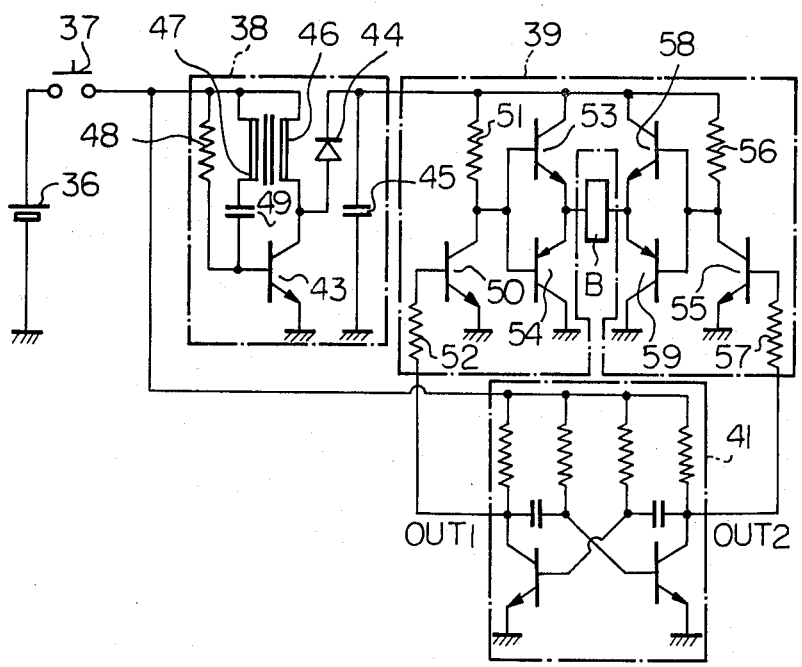
Figure 17:
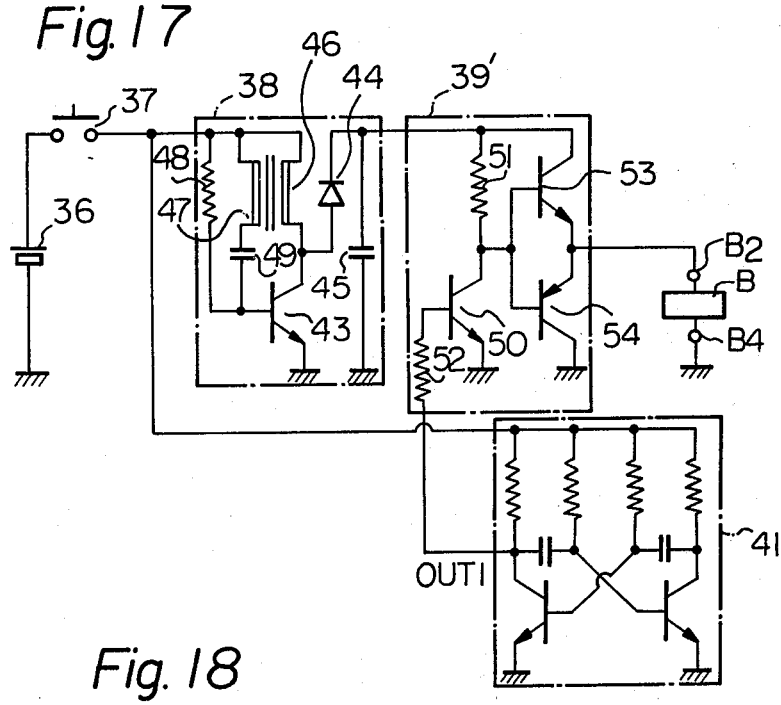
Figure 18:
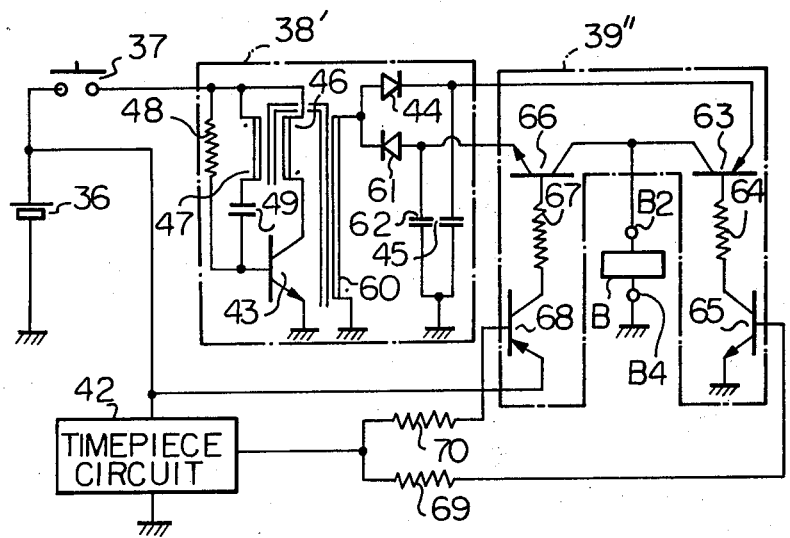
Figure 19:
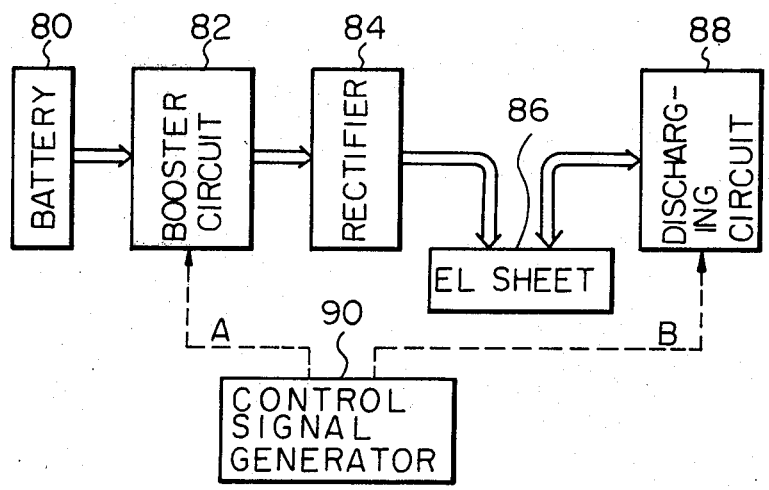
Figure 20:
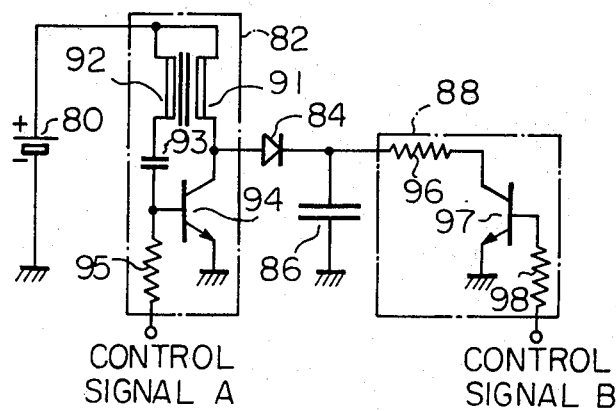
Figure 21:
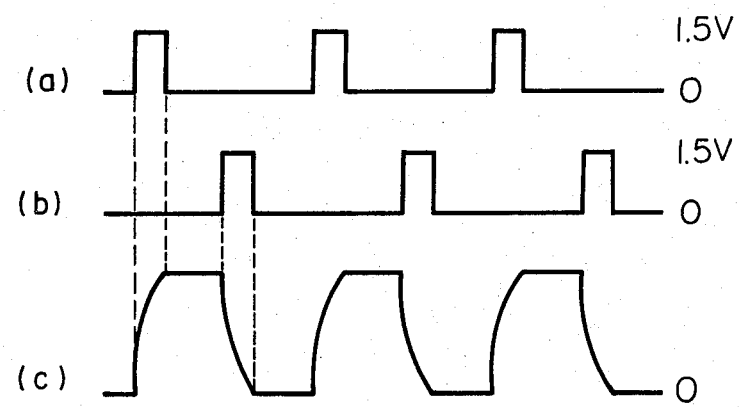
Figure 22:
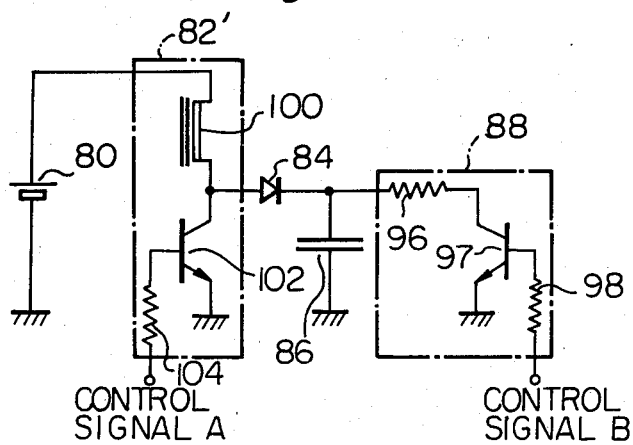
Figure 23:

FIGS. 7(a) and 7(b) illustrate respective plan views and cross-sectional views of a widely known liquid crystal display device;

FIGS. 8(a) and 8(b) are useful in describing the light paths encountered in the display device shown in FIGS. 6 and 7;

FIG. 9 is a cross-sectional view of a wristwatch incorporating the illumination in accordance with the invention;

FIGS. 10, 11 and 12 are block wiring diagrams of an electronic timepiece in accordance with the invention;

FIG. 13 and FIG. 14 are block diagrams illustrating the basic structure of other preferred embodiments of an illumination device of the present invention;

FIG. 15 is a graph showing the relationship between the driving voltage applied to the EL sheet and the intensity of the light emitted thereby;

FIGS. 16, 17 and 18 are circuit diagrams of a driving circuit for the illumination device shown in FIG. 13;

FIG. 19 is a block diagram illustrating another preferred example of a driver circuit for an illumination device in accordance with the present invention;

FIG. 20 and FIG. 22 are detailed circuit diagrams for the driving circuit shown in FIG. 19;

FIG. 21 shows waveforms indicative of the control signals which appear in the circuit of FIG. 20 as well as the potential at the terminals of the EL sheet;

FIG. 23 shows the waveforms indicative of the control signals which appear in the circuit of FIG. 22.

Figure 24:
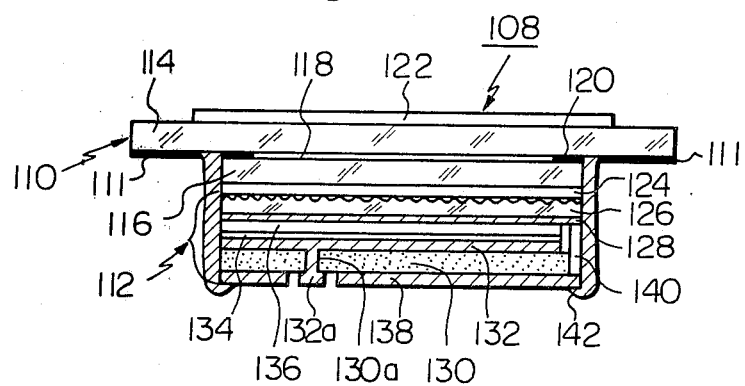
Figure 25:
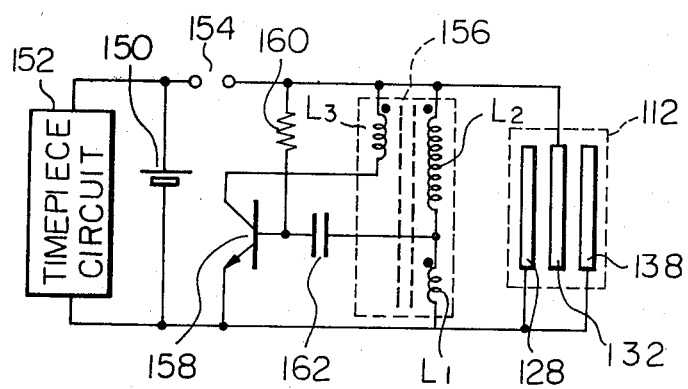
Figure 26:
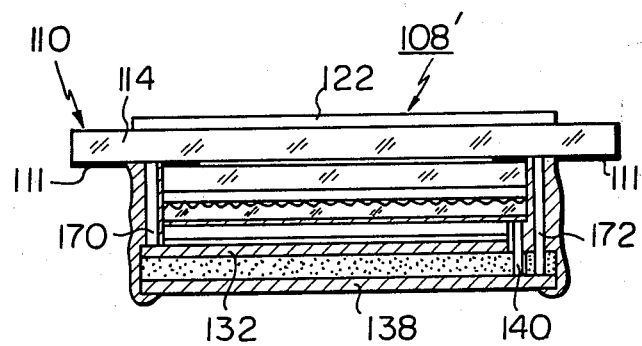
Figure 27:
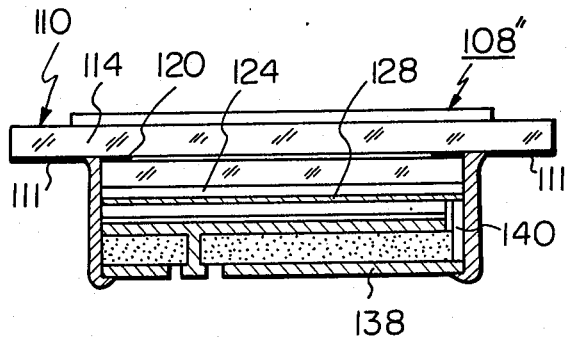
Figure 28:
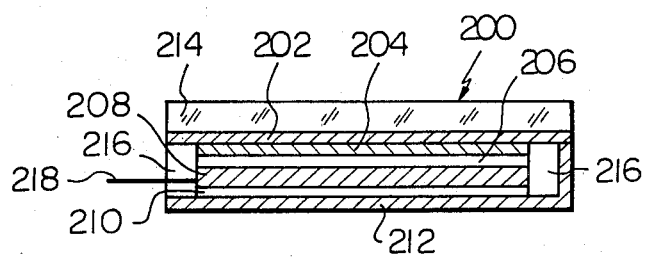
Figure 29:
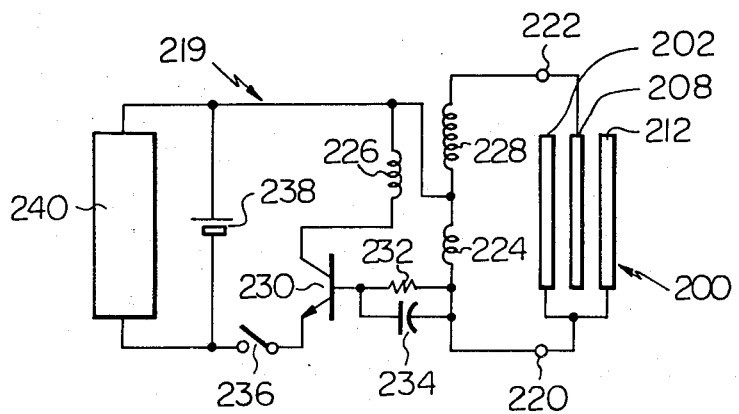
Figure 30:
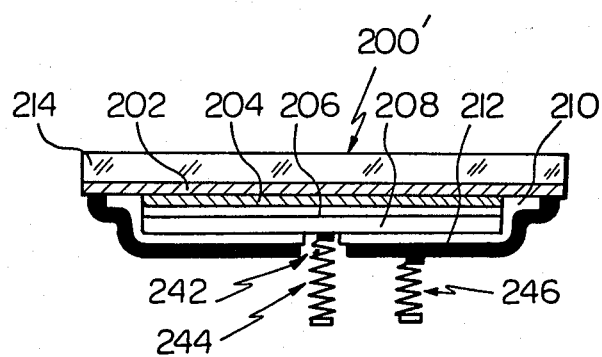
Figure 31:
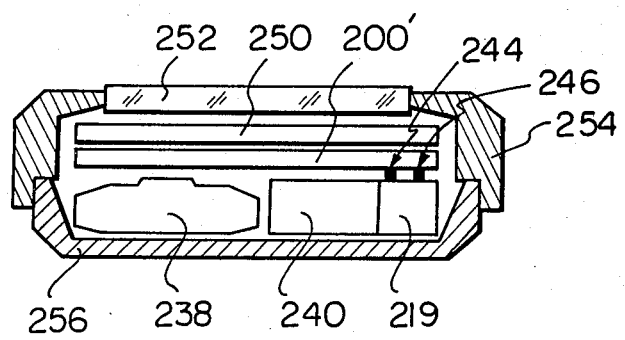
Figure 32:
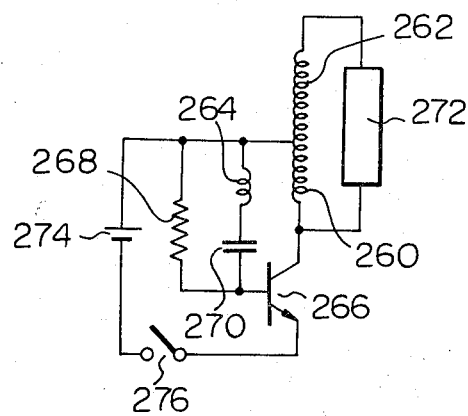
Figure 33:
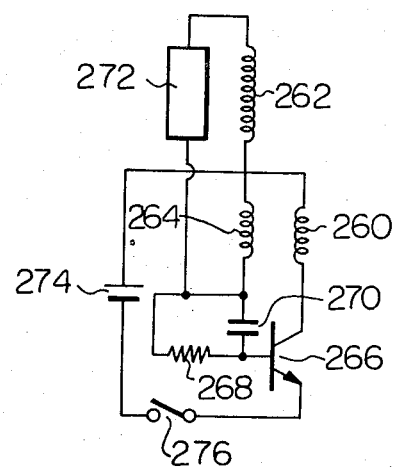
Figure 34:
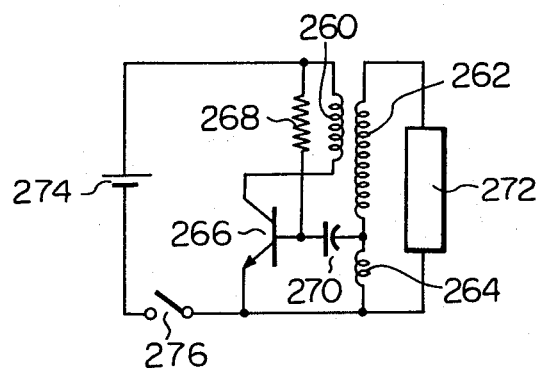

FIG. 24 is a cross section of another preferred example of an illumination device in accordance with the present invention;

FIG. 25 is a detailed circuitry for the EL sheet of FIG. 24;

FIG. 26 is a modification of the device shown in FIG. 24;

FIG. 27 is another modification of the device shown in FIG. 24;

FIG. 28 is a cross section of another preferred embodiment of an EL sheet in accordance with the present invention;

FIG. 29 is a detailed circuitry for a driving circuit of the EL sheet shown in FIG. 28;

FIG. 30 is a modification of the EL sheet of FIG. 28;

FIG. 31 is a cross section showing a watch case incorporating the EL sheet shown in FIG. 30;

FIG. 32 is a wiring diagram of another preferred example of an EL sheet driving circuit in accordance with the present invention;

FIG. 33 is a modified form of the circuit shown in FIG. 32;

FIG. 34 is still another modification of the circuit shown in FIG. 32; and

Figure 35:
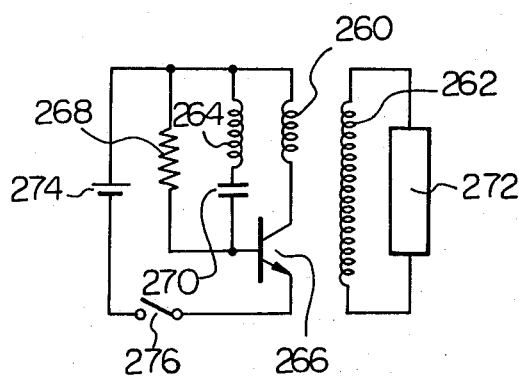

FIG. 35 is a further modification of the circuit shown in FIG. 32.

Figure 1:
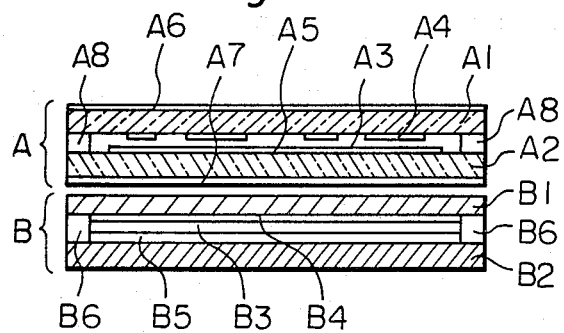

FIG. 1 depicts a cross-sectional view of a liquid crystal display device equipped with an illumination device in accordance with the invention, in which A denotes the liquid crystal display device and B an EL sheet disposed at the back of the display device. A1 and A2 designate a pair of glass plates, A3 a twist-type nematic liquid crystal, A4 and A5 a pair of opposing electrodes that embrace the liquid crystal, A6 and A7 polarizing plates the axes of polarization of which intersect each other at right-angles, and A8 a liquid crystal sealing member. According to this arrangement, the overlapping portions of the electrodes become transparent when a voltage is impressed across the electrodes, as is well known. A display pattern is obtained by dividing the upper or segment electrode A4 into a number of suitable segments. The EL sheet, on the other hand, includes a transparent or light-diffusive semitransparent substrate B1 such as a sheet of opal glass provided at its lower surface with a transparent thin film B4 which serves as an electrode, and a metallic sheet B2 coated at its upper surface with superposed layers of an insulating film B5 consisting of, for example, a barium titanate and an electro-luminescent material B3 disposed between the layers B4 and B5. The metallic sheet B2 and the substrate B1 are adhered to each other, the outer periphery along the boundary thereof being provided with a water-proofing seal B6 and adhered into place by means of an organic adhesive. As the transparent electrode there may be mentioned a metallic film obtained by vapor deposition and which is then subjected to etching to provide a mesh-like product, or a transparent electrode obtained by the vapor deposition of indium dioxide, or one produced by sintering the product of the hydrolysis of tin oxide. As the electro-luminescent material, zinc sulfide mixed with the usual small amount of copper may be used. Transparent electrode B4 and metallic sheet B2 serve as a pair of opposing electrodes so that the application across them of an AC voltage of between 100 and 200 volts causes the electro-luminescent material to emit light which passes through transparent electrode B4 and transparent substrate B1.

Figure 2:
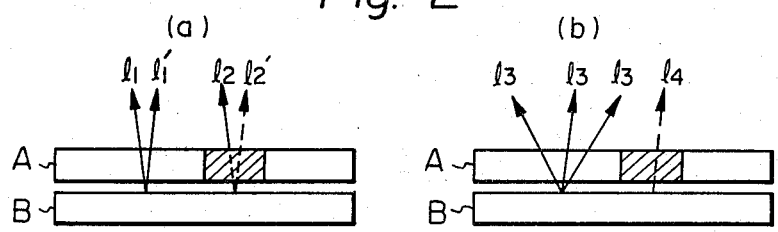
FIG. 2(a) illustrates the paths of light rays incident upon the liquid crystal display device from a point external thereto.
FIG. 2(b) illustrates the paths of light rays incident upon the EL sheet from a point external thereto.

FIG. 2(a) depicts light paths for a daylight situation accordance with the device of the invention. Light ray $l_1$ incident upon the non-display portion of liquid crystal display device A is reflected and diffused along path $l_1'$ by the light emitting layer, insulating layer or some other layer of EL sheet B. Whereas this reflected light reaches the eye of an observer, light ray $l_2$ incident upon the display portion of the device, shown by the slanted lines, is absorbed by the liquid crystals so that the portion of this light ray reflected along path $l_2'$ by the EL sheet B is returned as an extremely weak light ray $l_2'$. In consequence, a pattern made up of lightened and darkened zones appears on the surface of the liquid crystal display device. However, the distinctness of the display is not determined merely by the intensities of light rays $l_1'$ and $l_2'$ of their ratio; distinctness is governed in large part by overall brightness and tone, and in many cases depends upon the condition of the reflective surface. When using the EL sheet B as the reflective surface, good results can be obtained by adopting zinc sulfide as the main ingredient of the electro-luminescent material which thus will be a bright yellowish green in color, and employing as a lower layer barium titanate which is white. Further, in order to assure a clear display regardless of the positional relationship between the source of incident light and the eye of the observer, the reflective surface must be capable of offering diffused reflection. This can be accomplished to good effect since the zinc sulfide crystals consist of an irregular particulate having a maximum particle size of from 10 $\mu$m to 20 $\mu$m. An EL sheet of the type described will thus serve as a reflective surface having superior characteristics and is well suited to the purpose of reflecting available light.

FIG. 2(b) depicts light paths for a case in which the EL sheet is emitting light when disposed in a darkened location. Light rays emitted from EL sheet B which is excited by the application of a 100 v to 200 v AC voltage are incident upon the lower surface of liquid crystal display device A and reach the eye of the observer as light rays $l_3$, having impinged upon the non-display portion of the device. A light ray $l_4$ having impinged upon the display portion, shown here by the slanted lines, is absorbed by the liquid crystals and thereby attenuated. As a result, a pattern of lightened and darkened zones appears on the surface of the device, and a clear display is obtained since there is no non-uniformity of brightness by virtue of the fact that the EL sheet emits light uniformly over its entire surface. It is also possible to provide a colorful display since the spectrum of the emitted light can be varied by properly selecting the electro-luminescent material. Moreover, it is possible to interpose between the liquid crystal cell A and EL sheet B a layer which permits both the diffusion and transmission of light so that available light will be reflected during the day while the light emitted by the EL sheet is transmitted during the evening hours. A material having such a property may also be employed as a supporting medium for the polarizing plate A7, or it may be incorporated in the laminated structure of the liquid crystal cell A and EL sheet B.

Figure 3:
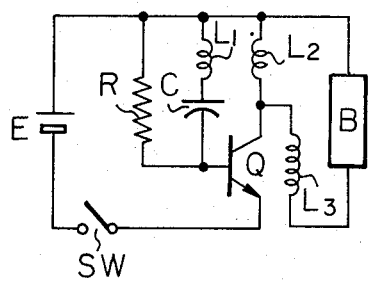
FIGS. 3, 4 and 5 are circuit diagrams of inverter circuits which generate a high AC voltage for driving the EL sheet of FIG. 1.

FIG. 3 illustrates an embodiment of an inverter circuit to be installed in a timepiece for the purpose of driving the EL sheet constructed as shown in FIG. 1. A power source such as battery E supplies electrical power to both the inverter circuit as well as the other timepiece circuitry. When it is necessary to excite the EL sheet into emitting light, a booster circuit is supplied with electrical power through the closure of switch SW which is controlled by an external control member located on the watchcase. Transistor Q, resistor R, condenser C and a transformer having three coils L1, L2, L3 constitute a collector tuned back coupled oscillator in which the EL sheet B serves as a collector tuned condenser. It can also be conjectured from the construction of this circuit that the EL sheet B includes a series connected condenser component CE. The three coils L1, L2, L3 are all wound in the same direction, the beginning end of each winding being indicated by the back dots in the drawing. By providing coil L3 with a number of windings sufficiently larger than the number of windings of coils L1 and L2, the collector tuned circuit will generate a high voltage AC current for exciting the EL sheet into a light emitting state.

Figure 4:
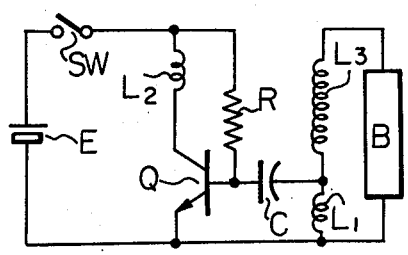

FIG. 4 illustrates a base tuned back coupled oscillator employing the same circuit components as that of the EL sheet driver circuit shown in FIG. 3. The present circuit also functions as a booster circuit in the same manner as that of FIG. 3.

Figure 5:
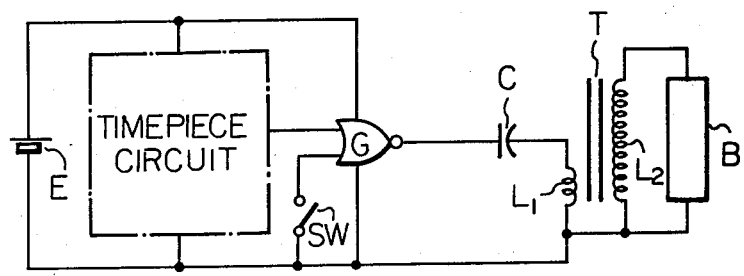

FIG. 5 illustrates a circuit for driving an EL sheet at a suitably divided frequency for a case in which a timepiece, such as a wristwatch equipped with a crystal controlled oscillator, includes a source of oscilations. In the drawing, T denotes a transformer having a primary coil L1 and a secondary coil L2, the number of windings of the secondary coil being approximately 100 times larger than that of the primary coil. C designates a condenser for blocking the flow of DC current. G denotes a gate which, through the operation of the illumination switch SW, controls the driving frequency signal obtained from the timepiece mechanism. Battery E supplies electrical power to both the timepiece mechanism and gate G. Thus when illumination switch SW is closed, a DC voltage having a peak value equal to that of the approximate battery voltage is applied to the primary coil L1 of transformer T in response to an output signal supplied by gate G. Hence, the high voltage induced in secondary coil L2 is applied to the EL sheet B, i.e., the load connected in the secondary line, which accordingly begins to emit light.

In accordance with the embodiment of the invention as described, the surface of a liquid crystal display device can be uniformly illuminated without any non-uniformity in brightness. The commercial value of a wristwatch can be raised by employing an electroluminescent display of various colors, the thickness of the wristwatch is reduced due to the fact that the EL sheet is a thin layer which can be adhered to the back surface of a liquid crystal display device, this also being a factor in preventing the reflection of double images when the timepiece is viewed in daylight. Further, excessive power consumption is precluded by virtue of the fact that the voltage used to drive the EL sheet can also be obtained from the same battery and booster which are employed to power the timepiece mechanism, while the operation of the booster itself is controlled by means of the illumination switch. It is thus possible to overcome the difficulties which were experienced in former attempts to incorporate an EL sheet in a timepiece.

FIG. 6 is a cross-sectional view of an EL sheet incorporated in a timepiece which conforms to the present invention. The surface area of the EL sheet is approximately equal to that of the surface display area of the liquid crystal display device. Reference numeral 11 denotes a 1st electrode which is composed of a metal plate such as aluminum, and reference numeral 12 designates a 2nd electrode which is composed of a thin film of indium oxide or tin oxide, or a thin metallic film such as aluminum which is optically transparent and processed to form a mesh-like pattern. An insulating film 13 composed of barium titanate is formed on the surface of the 1st electrode 11, and a layer 14 of an electroluminescent material consisting of zinc oxide added with a small amount of copper is disposed between the insulating layer and the 2nd electrode 12. In order to insulate the electrodes, protect the internal structure and ensure moisture resistance, the entire outer surface of the body thus formed is provided with a covering layer 15 consisting of glass or a sheet of plastic such as trifluoro-ethylene. Reference numerals 16 and 17 represent leads connected to the 1st and 2nd electrodes, respectively. Impressing a peak AC voltage of at least 150 v across the two electrodes of the EL sheet possessing this structure causes the electro-luminescent material 14 to emit light which, after passing through the transparent 2nd electrode 12 and transparent covering 15, is radiated as an attractive green-colored light. It is possible to fabricate an EL sheet having an actual thickness of only 300 $\mu$m, and the surface area can be held to approximately 1 mm$^2$ by adopting a plastic sheet as the covering 15.

FIG. 7 illustrates the well-known structure of a liquid crystal display device to which the EL sheet of FIG. 6 is applied. FIG. 7(a) shows a plan view and FIG. 7(b) depicts a cross-sectional view of the same. With reference to FIG. 7(b), an upper glass layer 22 on the surface of which is formed a transparent 1st or segment electrodes 18 (indicated by the slanted lines) is joined by means of a sealing member 24 to a lower glass layer 23 on the surface of which is formed a transparent 2nd or common electrode 20, a clearance of approximately 10 $\mu$m being maintained between the 1st and 2nd electrodes so as to accommodate twist nematic type liquid crystals which are introduced between the upper and lower glass layers. Polarizing plates 25, 26 are disposed on the top surface of upper glass layer 22 and on the bottom surface of lower glass layer 23, respectively. If the axes of polorization of the polarizing plates are arranged so as to intersect each other at right-angles, the liquid crystal display device will maintain its normal transparent state but will attain a state of non-transparency at those portions where the electrodes overlap when a voltage is impressed across the electrodes 18 and 20. In other words, the liquid crystal display device presents a positive image. On the other hand, if the axes of polorization of the polarizing plates are arranged in parallel, the display device will maintain its normal transparent state but the transparency will remain only at those portions where the electrodes 18 and 20 overlap when a voltage is impressed across them. This liquid crystal display device will thus present a negative image.

With reference to FIG. 7(a), the portions of the drawing designated by the slanted lines denotes the portions where there is superposition between the transparent 1st electrode 18 formed on the upper glass layer 22 and the 2nd transparent electrode 20 formed on the lower glass layer 23, these latter two components not being visible in this particular drawing. The arrangement shown conforms to a typical display often made use of in liquid crystal display devices. The 1st electrode 18 is composed of 23 separate segments each of which is comprised of a display pattern shown in the drawing by the slanted lines, and a wire lead 19 represented by the heavy lines. On the other hand, 2nd electrode 20 is connected to the display patterns by means of wiring 21 represented in the drawing by the dotted lines, only one of the wire leads 19 being necessary for this purpose. Wire lead 19 of the 1st electrode 18 is disposed so as not to overlap the wiring for 2nd electrode 20. By using suitable driving and power source means to apply a potential across the 2nd transparent electrode 20 and the 1st transparent electrode 18 which is selected to provide a given display, a desired display pattern can be obtained as a difference in the transmissivity of the observed light rays.

Figure 8:
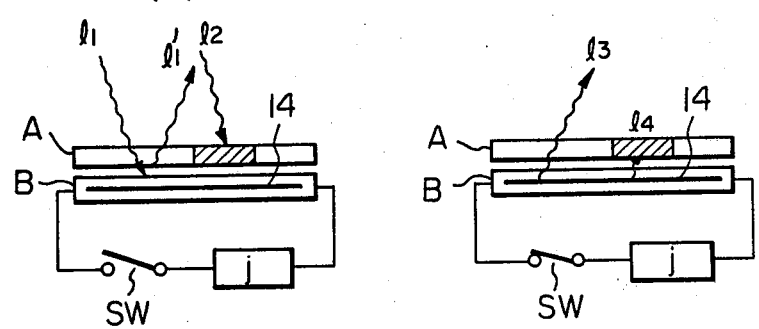

FIG. 8 is useful in explaining the light paths which result when the above-mentioned liquid crystal display device is combined with the EL sheet and installed in a timepiece. The drawing is a cross-sectional view of a liquid crystal display device A and EL sheet B disposed adjacent to the back surface of the display device and parallel thereto. FIG. 8(a) illustrates the light path for a case in which the timepiece of the present invention is viewed under conditions of available light. In this case, a driver circuit j for the EL sheet B has been opened by means of a switch SW. The circuit is opened in order to prevent the double excitation which results due to light incident upon the EL sheet and the electric field induced by the circuit, and for the purpose of precluding wasteful power consumption. Light ray $l_1$ incident upon the transparent portion of liquid crystal display device A from a point external thereto reaches the electroluminescent material 14 of the EL sheet B, is diffused by its crystals and reflected back to the eye of the observer as reflected light ray $l_1'$. On the other hand, light ray $l_2$ incident upon the non-transparent portion of the display device is absorbed. As a result, the transparent portion of the display device A appears to possess the bright color of the electro-luminescent material, while the non-transparent portion appears black.

FIG. 8(b) depicts light paths for a case in which the EL sheet B is emitting light when disposed in a darkened location, the switch SW having been closed in order to complete the circuit. Of the rays emitted from the electro-luminescent layer 14, only light ray $l_5$ which is incident upon the transparent portion of liquid crystal display device A reaches the eye of the observer; light ray $l_4$ incident upon the non-transparent portion is absorbed by the display device. Thus, an observer can see, through the transparent portion of the display device, the color of the light emitted by the EL sheet, while the non-transparent portion of the device appears black.

It is therefor possible to produce a timepiece which can be easily read in both lightened and darkened environments by combining light receptive elements such as the liquid crystal display device A, and light emissive elements such as the electro-luminescent sheet B. However, since it is necessary to apply an AC voltage having a peak value of 150 v across the electrodes in order to allow the EL sheet to emit light, the electric field which is generated in the vicinity of the electrodes has an adverse affect upon the liquid crystal display device and the MOS-FET components which are included in the circuitry for the timepiece mechanism. This can lead to erroneous display readings and timepiece malfunction.

FIG. 9 is a cross-sectional view of the basic construction of a wristwatch equipped with a liquid crystal display device and another preferred embodiment of an EL device according to the present invention. Liquid crystal display device A, which has already been described, is driven by a timepiece circuit d. The previously described EL sheet B is connected to driver circuit j which drives the EL sheet and is powered by battery e. A shield plate f is disposed between the EL sheet B and the substrate d, and is held at the same potential as an upper electrode, of the EL sheet B, which is nearest the liquid crystal display device A. All of these structural components are accommodated within a watch case comprising a case member h, back cover i, and watch glass g. In this structure it is particularly important to note that the liquid crystal display device A, EL sheet B and shield plate f constitute a three-layered structure, and that the timepiece circuitry is accommodated below the lowermost layer which is the shield plate f. Thus, by electrically connecting the electrode of the EL sheet nearest the liquid crystal display device as well as the shield plate f to a common point having a suitable potential, it is possible to shield the electric field generated by the other electrode of the EL sheet to which the high voltage is to be applied.

FIG. 10 is a wiring diagram in accordance with the invention and relates to the structure shown in FIG. 9. In the drawing, the electrodes 18, 20 of liquid crystal display device A, the electrodes 11, 12 of EL sheet B, and shield plate f are superposed in that order. Although electrode 18 of the liquid crystal display device is actually divided into a number of independent segments as shown in FIG. 7, only one electrode is illustrated for the sake of explanation. Timepiece circuitry d including MOS-FET components and the like is disposed at the back of shield plate f and connected to battery e, and a driving voltage is applied to both electrodes of liquid crystal display device A. Driving circuit j for the EL sheet B is connected to battery e by means of switch SW which is controlled by an external control member provided on the watch case, and is operative to convert the battery voltage to high voltage AC which is then applied across both electrodes of the EL sheet. Shield plate f and electrode 12 nearest liquid crystal display device A are both connected to a common electrode of the battery e, thereby shielding the electric field produced by electrode 11.

FIG. 11 is an embodiment of a circuit useful in providing a concrete explanation of the electric field shielding system previously described with reference to FIGS. 9 and 10. In FIGS. 11(a) and 11(b), an EL sheet driver circuit j comprising a transformer having three windings L1, L2, L3, a transistor Q, resistor R and condenser C is connected through a switch Sw to a battery e which also supplies power to the timepiece circuit d. A back coupled oscillator is formed of a tuning capacitor which is defined by the electrostatic capacitance between electrode 11 of the EL sheet and electrode 12 which is nearest the liquid crystal display device, and between electrode 11 and the shield plate f. FIG. 11(a) shows the tuned circuit connected to the base of transistor Q, and FIG. 11(b) shows the tuned circuit connected to the collector of the transistor. In both these circuits the number of windings of transformer coil L3 is sufficiently larger than that of coils L1 and L2 so that a high AC voltage can be applied to the EL sheet. Here, electrode 12 of the EL sheet and shield plate f are connected to a common terminal of the battery in such a manner that there is no large potential difference between them and any point on the timepiece circuit d.

FIG. 11(c) illustrates an EL sheet driving circuit comprising a transformer having a pair of coils L1, L2, a condenser C, and a semiconductor gate G controlled by a timepiece circuit d in response to the manuplation of a switch SW. Gate G is connected to the same battery e that supplies power to the timepiece circuit d, and is furnished by the electrical circuitry of the timepiece mechanism with a DC voltage in the form of a square wave having a constant frequency. When switch SW is closed, the square wave voltage is power amplified by gate G and then applied to the primary coil L1 of the transformer after the DC component is blocked by condenser C. A high AC voltage is thus applied across the electrodes of the EL sheet B since the number of windings of the secondary coil L2 is sufficinetly greater than that of the primary winding; however, shield plate f and the electrode 12 of the EL sheet B are both connected to a common terminal on the battery e so that there is no large potential difference between these components and any portion of the timepiece circuit.

FIG. 12 illustrates an embodiment of a circuit wherein a special purpose battery $e_1$ which supplies power exclusively for driving the EL sheet is connected through a switch SW to an EL sheet driving circuit comprising a transistor Q, resistor R, condenser C and a transformer having three coils L1, L2, L3. This circuit is a modified version of those depicted in FIGS. 11(a) and 11(b). In this case, electrode 12 and shield plate f are connected to special-purpose battery e for the timepiece circuit and therefore shield the electric field which is generated by electrode 11 of the EL sheet B. The same effect can be obtained even if like electrodes of batteries $e_1$ and e are connected.

FIG. 13 is a block wiring diagram illustrating the principal structure of another preferred embodiment of an illumination device in accordance with the invention. Battery 36 installed within a timepiece is connected to a booster circuit 38 through a switch 37 which is closed by means of an external member provided on the case of the timepiece. Booster circuit 38 converts the 1.5 v to 3.0 v battery voltage to a DC voltage between several tens of volts to several hundred volts necessary to drive the EL sheet. The converted voltage is then applied to EL sheet 40, having the same structure shown in FIG. 1, after passing through a switching device 39 which is intermittently applied with a low frequency control signal. The switching device is controlled by a low frequency control signal generator 41. Here, a low frequency control signal will be taken to mean a signal having a frequency between 30 Hz and 300 Hz. For example, a low frequency signal of 30 Hz can be produced even by mechanical means.

FIG. 14 is a modification of the block diagram shown in FIG. 13. Here, battery 36 serves as the power source for the time-keeping circuit 42 of the timepiece mechanism as well as for EL sheet 40 of the illumination device. This particular arrangement greatly economizes on space and reduces battery cost. Moreover, the special-purpose low frequency control signal generator 41 illustrated in FIG. 13 can be eliminated since the signal which controls switching device 39 can be obtained from time-keeping circuit 42. Owing to the fact that the time-keeping circuits in modern electronic timepieces incorporate a circuit which makes use of cascade connected flip-flops to successively device and thus reduce a high frequency signal in excess of 30 Khz to a low frequency signal, it is possible to obtain a suitable control signal for control of switching device 39 by removing the signal from the appropriate stage of the divider circuit. Even if an output buffer circuit is added by incorporating the time-keeping circuit in an integrated circuit and through the addition of one external output terminal there is no severe detrimental effect upon space or cost requirements so that this option is far more economical than installing a special-purpose low frequency oscillator.

FIG. 15 illustrates a graph the vertical axis of which represents, in terms of relative values, the intensity of light emitted from the EL sheet of FIG. 1 for a case in which the EL sheet is driven by a voltage in the form of a rectangular wave having a duty ratio of 50%. The horizontal axis of the graph represents, in terms of volts, the difference in voltage between the high and low levels of the rectangular wave. The frequency of the wave is adopted as a parameter. It may be understood from the graph that the EL sheet begins emitting light when the difference between the high and low voltage levels of the applied voltage exceeds 40 v, and that the intensity of the emitted light increases linearly for values greater than 60 v. For a case in which the intensity indicated by the dotted line in the graph is a practical intensity which provides sufficient timepiece illumination for viewing in the evening hours, it is required that the level difference of the applied voltage be 122 v for 32 Hz, 100 v for 64 Hz, 86 v for 128 Hz, 75 v for 256 Hz, and 68 v for 512 Hz. As pointed out previously, the EL sheet can be considered as functioning as a condenser. In general, when the voltage of a DC power source is converted to a rectangular wave voltage by switching and then applied to a condenser, the electrical current I can be given by the following formula $$I = kCVF$$

if the output impedance of the power source is neglected, wherein C is the capacity of the condenser, V is the difference between the high and low levels of the rectangular wave voltage, and F is the frequency of the voltage. The factor k is a constant determined by the arrangement of the driver circuit; k has a value of 2 for a circuit in which the charge stored in the condenser is discharged through a DC power source, and a value of 1 for a circuit in which the discharge path is a separate by-pass circuit.

In accordance with the invention, the high voltage for driving the EL sheet is obtained through the conversion of the battery voltage as accomplished by the booster circuit. If $\eta$ is taken as the conversion efficiency, the power consumption Io with respect to the battery for the EL sheet is given by the following formula $$I_o = \eta k C V^2 F / V_o,$$

wherein Vo designates the battery voltage. If k=1, C=2000 picofarads, Vo=1.5 v and the conversion efficiency n=0.5, then the previously mentioned voltages and frequencies which provide the practical intensity can be substituted in the above equation to give the corresponding electrical currents which must be provided by the DC power source to drive the EL sheet. Thus, the relationship between frequency and current may be given as:

32 Hz . . . 0.32 milliamps
64 Hz . . . 0.43 milliamps
128 Hz . . . 0.63 milliamps
256 Hz . . . 0.96 milliamps
512 Hz . . . 1.58 milliamps In other words, the current supplied by the battery at 512 Hz is 5 times the current at 32 Hz. It is thus apparent from these calculations that the frequency of the rectangular wave voltage be sharply reduced and the difference in voltage levels increased when designing an EL sheet driver circuit of the aforementioned type in which the EL sheet is applied with a voltage in the form of a rectangular wave produced by first using a booster circuit to convert the battery voltage to a high DC voltage and then employing switching means to convert the high DC voltage into the desired rectangular wave.

It is known that the lifetime of a dispersive-type alternating current EL sheet is greatly dependent upon the frequency of the exciting voltage waveform. In other words, if the initial intensity is fixed, the higher the frequency of the exciting voltage, the more pronounced is the decrease in intensity due to degradation with the passage of time. For example, an EL sheet driven at a frequency of 10 Khz will suffer a 50% loss in intensity in approximately 5 hours. Since both the wristwatch and the illumination device must be capable of performing reliably over a long period of time, a system in which the EL sheet is driven at a frequency in excess of 1 Khz must be avoided in order to preclude a pronounced reduction in the lifetime of the EL sheet. Although systems other than that of the present invention have been proposed in which conservation of battery power is effectively accomplished through the use of an LC resonance circuit comprising a coil in combination with the EL sheet which serves as a capacitor, it has been extremely difficult to provide a resonance frequency which does not exceed several kilohertz since it is not possible to install a sufficiently large reactance in the narrow confines of a wristwatch. On the other hand, when the frequency of the driving voltage drops below 30 Hz, the afterimage which remains on the human eye and the after glow (persistence) of the light emitting material of the EL sheet become important factors which contribute to a flickering phenomenon. An illumination device which exhibits this flickering phenomenon is tiring to observe and therefore must be avoided.

Accordingly, in consideration of the afore-mentioned three factors, i.e., conservation of power, prolongation of EL sheet lifetime and prevention of flickering, the useful frequency of the EL sheet driving voltage is greater than 30 Hz but less than 300 Hz. When the signal for controlling switching device 9 in FIG. 3 is obtained from time-keeping circuit 12 of the timepiece mechanism, a time-keeping signal having a succession of frequencies which are powers of n (where n is a positive integer) can be found within the time-keeping circuit; hence, the useful frequencies are 32 Hz, 64 Hz, 128 Hz, and 256 Hz.

FIG. 16 is a preferred embodiment of a detailed circuit arrangement for the illumination device illustrated in FIG. 13. Battery 36, through the intermediary of switch 37 closed through operation of a control member provided on the watchcase, supplies electrical current to booster circuit 38 and control signal generator 41 for the switching device 39. Booster circuit 38, which includes a widely known blocking oscillator comprising a transistor 43, a transformer having two coils 46, 47, a resistor 48 and a condenser 49, rectifies and filters the collector voltage of the blocking oscillator by means of diode 44 and condenser 45, respectively, whereby the battery voltage is converted to a DC voltage ranging from several tens of volts to several hundred volts.

Control signal generator 41 is a typical astable multivibrator of which the two output signals $OUT_1$, $OUT_2$ are rectangular DC signals that are complimentary to each other and serve as the control signals of switching circuit 39. The transistors 50, 55 along with respective collector resistors 51, 56 and base resistors 52, 57 form an inverter circuits, the transistor 50, 55 defining an interface which converts output signals $OUT_1$, $OUT_2$ to high voltage switching signals. In switching device 39 the switching elements are a pair of complementary emitter follower circuits which incorporate transistors 53, 54 and transistors 58, 59, respectively, the output sides of the emitters being connected to the respective electrodes of the EL sheet B.

When switch 37 is closed, the blocking oscillator of booster circuit 38 begins oscillating and a high voltage signal in the form of spikes appears at the collector of transistor 43. The high voltage spikes are passed by diode 44 and stored in condenser 45 so that the voltage which appear at the output terminal of the condenser attains a value approximately equal to that the peak value of the spiked voltage. Meanwhile, control signal generator 41 also begins operating and produces the two complementary output signals $OUT_1$, $OUT_2$ which are the rectangular DC waveforms. When output signal $OUT_1$ is at a high potential level, transistor 50 is rendered conductive so that its collector voltage drops to a low level thereby rendering transistor 53 non-conductive and transistor 54 conductive. At this time output signal $OUT_2$ is at a low level so that transistor 55 is rendered non-conductive, its collector voltage attaining a high level. Hence, transistor 58 is rendered conductive and transistor 59 non-conductive. As a result, the high output voltage obtained from booster circuit 38 is applied to EL sheet B by means of transistors 54 and 58. If output signals $OUT_1$, $OUT_2$ are now reversed, transistors 54, 58 are rendered non-conductive and transistors 53, 59 are rendered conductive so that the high voltage signal is applied to the EL sheet from the opposite direction. By repeating this reversal of signals $OUT_1$, $OUT_2$, the pair of complementary emitter follower circuits are alternatingly connected to the high and low voltage levels in an exclusive fashion so that the EL sheet B is applied with a rectangular AC voltage the difference between the high and low levels of which is twice the output voltage supplied by the booster circuit 38.

Since the electrodes which embrace the EL sheet B in FIG. 16 alternatingly shift between high and low potentials, neither of the electrodes can be held at a fixed potential; accordingly, a fluctuating electric field appears in the space on either side of the EL sheet. This fluctuation in the electric field about the periphery of the EL sheet interferes with the timepiece circuit and can therefore make it impossible to obtain an accurate display of time, this being attributable to the fact that the circuit components which are employed in electronic timepieces must generally possess a high impedance to conserve power and must also be arranged in a high density to conserve space. The higher the driving voltage is raised for the purpose of heightening the intensity of the EL sheet. the greater is the strength of the electric field which will thus come to have a more pronounced effect upon the timepiece circuit.

In order to preclude erroneous timepiece operation due to the electric field, a shielf plate must be provided about the outer periphery of the EL sheet for the purpose of shielding the electric field; however, this can pose problems since a shield on the light emitting side of the EL sheet must make use of a transparent semiconductor. Accordingly, when an EL sheet is incorporated in an electronic wristwatch it is imperative that the potential of the transparent electrode B4 of the EL sheet B shown in FIG. 1 be fixed and that this potential be approximately equal to that of the timepiece mechanism.

FIG. 17 illustrates an embodiment which is a modification of the circuit shown in FIG. 16, and represents an improvement in which a shield plate is unnecessary. More specifically, a shield plate on the light emitting side of EL sheet B can be dispensed with since the potential of electrode B4 is fixed and equal to the reference potential of the timepiece circuit. In the drawing, the battery 36, switch 37, booster circuit 38 and control signal generator 41 are identical to their counterparts in FIG. 16 but the potential at the transparent electrode B4 of EL sheet B is fixed. Accordingly, switching circuit 39' constitutes a level shift circuit composed of one set of complementary transistors 53, 54, transistor 50 and resistors 51, 52, hence, only one control signal, namely $OUT_1$, will suffice. When the output signal $OUT_1$ obtained from control signal generator 41 is at a low level, transistor 50 is rendered non-conductive so that the potential at the collector is raised to a high level. As a result, transistor 54 is rendered non-conductive and transistor 53 conductive so that electrode B2 of EL sheet B is connected to the output side of booster circuit 38, whereby the EL sheet is charged to a high voltage.

When signal OUT₁ attains a high level, transistor 50 conducts, its collector potential falls to a low level, and transistor 53 is rendered non-conductive. This in turn renders transistor 54 conductive so as to discharge the electrical charge stored in the EL sheet B. When signal OUT₁ is in the form of a rectangular wave, EL sheet B is charged and discharged repetitively and the voltage which appears at its terminals possesses the form of a rectangular wave which is defined by the difference in the high and low voltage levels of the output signal voltage obtained from booster circuit 8a. Although this particular wave has the form of a DC voltage which is superimposed on an AC voltage, the superimposed DC voltage, as was mentioned previously, does not contribute toward inducing a light emitting state in a dispersive type alternating current EL sheet.

FIG. 18 shows another embodiment of the invention in which the potential at the light emitting side of the EL sheet is fixed without superimposing a DC voltage on the driving voltage of the EL sheet. Referring to the drawing, battery 36 is connected through switch 37 to booster circuit 38' and at the same time supplies electrical power to the timepiece circuit 42 of the electronic timepiece. Booster circuit 38' includes a transistor 43, resistor 48, condenser 49, a transformer having three coils 46, 47, 60, rectifying diodes 44, 61 and filter condensers 45, 62. Thus, the booster circuit constitutes a transformation blocking oscillator which begins to oscillate when connected to the power source. The oscillations are harmonic owing to the capacity distribution parasitically induced by coil 60. If the turn ratio of coil 60 to coil 46 is taken to be n/1 and if we let the battery voltage be Vo, a sinusoidal AC voltage having an effective voltage V will appear at the ends of coil 60, with V being given by the abbreviated equation $$V = nVo/\sqrt{2}.$$

This AC voltage is reversed and rectified by diodes 44 and 61, respectively, whereby a DC voltage having a magnitude of $\sqrt{2}$ V appears at the ends of condensers 45 and 62. If the ends of condensers 45, 62 at a neutral potential are considered to be representative of a reference potential, a DC voltage having a magnitude of $+\sqrt{2}$ V and $-\sqrt{2}$ V will appear at the opposite ends of the condensers, respectively. It is possible to obtain a DC voltage having an absolute value of from several tens of volts to several hundred volts by increasing the afore-mentioned turn ratio.

Switching circuit 39'' is composed of two sets of Darlington connected transistors, one set of which comprises a PNP transistor 63, an NPN transistor 65 and resistor 64, the other of which comprises an NPN transistor 66, a PNP transistor 68 and a resistor 67. The collectors of transistors 63 and 66 are both connected to the electrode B2 on the non-light emitting side of EL sheet B. The transparent electrode B4 of EL sheet B is held at the reference potential located at the neutral point of the two condensers which are included in booster circuit 38', and is connected to the negative electrode of the battery. The bases of transistors 66, 68 are connected to one terminal of respective resistors 69, 70 the other ends of which are connected to a control signal generating circuit included in the timepiece circuit 42 of the electronic timepiece. The reference potential of the timepiece circuit 42 is also derived from a common connection with the negative side of the battery, and the control signal is a rectangular DC wave derived from the difference between the high and low voltage levels of the battery voltage.

In the circuit constructed above, the Darlington connected transistors comprising transistors 63, 65 are rendered conductive when the control signal, obtained as an output from timepiece circuit 42, is at a high level. Accordingly, the Darlington connected transistors comprising transistors 66, 68 are rendered non-conductive so that electrode B2 of EL sheet B is connected to the positive DC output side of booster circuit 38' thereby charging the EL sheet in the positive direction. Next, when the control signal drops to a low level, transistors 63, 65 are rendered non-conductive and transistors 66, 68 are rendered conductive; hence, electrode B2 of EL sheet B is connected to the negative DC output side of the booster circuit 38' so that the EL sheet is charged in the negative direction. Thus, the EL sheet is alternatingly charged positive and negative in response to changes in the control signal so that, in effect, an AC rectangular voltage is applied to the EL sheet, which will therefore emit light. In this case, the DC component impressed upon the EL sheet is the battery voltage only so that the withstand voltage of the EL sheet need be only half that of the withstand voltage required in FIG. 17.

Although the switching device has been shown and described as composed of MOSFETs in FIGS. 16, 17 and 18, any of the switching devices may also be constructed of bi-polar transistors. Such transistors, when used to drive the EL sheet, are the best suited switching elements for use in the invention since a circuit constructed with them is small in size, possesses a long life and can withstand the required high voltages. In the future, it may be possible to further reduce the voltage necessary for driving the EL sheet, or advances in MOS-FET technology may make it possible to realize complementary MOS transistors which can withstand high voltages. In such a case, the switching circuit may be capable of being incorporated in the IC circuitry used to construct the time-keeping circuits of the timepiece mechanism.

In accordance with the present invention it is possible to incorporate in a wristwatch an illumination device which provides sufficient illumination with little consumption of power without relying upon hazardous radioactive material. The fact that the device operates at low power and that there is no current overload due to the surge current which was associated with incandescent lamps means that it is now possible to make use of an unlimited variety of batteries which possess excellent shelf life and long-term, low current load characteristics. It is also possible, at the same time, to greatly extend battery lifetime. On the other hand, for a given battery lifetime, battery size can be further reduced so that a more attractive, compact wristwatch can be designed. Moreover, since the EL sheet is a planar light emitting body with a uniform intensity and can be produced so as to emit light of different colors, the illumination of the timepiece display device can be greatly enhanced and the commercial value of the timepiece increased.

FIG. 19 is a block wiring diagram of another preferred embodiment of a driving circuit in accordance with the present invention. A battery 80 which is accommodated within a timepiece supplies electrical power to a booster circuit 82 controlled in response to a control signal A. Booster circuit 82 serves to convert the voltage of battery 80 to a high voltage ranging from several ten to several hundred volts. The high voltage output of the booster is connected across a rectifier 84 to one electrode of EL sheet 86 and to a discharge circuit 88 which is controlled by means of a control signal B. The two control signals A and B are supplied by a control signal generator 90 and are applied exclusively to their respective circuits 82 and 88 and cause these circuits to operate in an alternating manner. Thus, when booster circuit 82 is brought into operation by control signal A, a high voltage signal is produced at the output of the booster circuit and applied across rectifier 84 so that the EL sheet is charged to a high voltage. Even if control signal A causes booster circuit 82 to cease operating, the electrical charge stored in EL sheet 86 will not flow back to the booster owing to the existence of the rectifier 84, hence, EL sheet 86 will remain biased at a high voltage. Next, when discharge circuit 88 is rendered operative by the arrival of control signal B, the electrical charge stored in EL sheet 86 is discharged so that there is a drop in the voltage at the terminals thereof. Even when control signal B renders the discharge circuit inoperative, there will be no increase in the voltage across the terminals of the EL sheet until booster circuit 82 is once again rendered operative. Thus, a rectangular DC waveform can be made to appear across the terminals of EL sheet 86 by operating booster circuit 82 and discharge circuit 88 in an alternating manner. From what was mentioned earlier about the DC component of the AC voltage not playing a role in rendering the EL sheet light emissive, it follows that the EL sheet will emit light providing that the peak value of the DC rectangular wave is sufficiently large. If the frequency of the discharge cycle is made greater than 30 Hz, the persistence of the EL sheet as well as the afterimage in the eye of the observer enable attractive electro-luminescence to be obtained.

FIG. 20 is a circuit diagram illustrating a detailed circuitry for the driving circuit of FIG. 10. A booster circuit 82 constitutes a blocking oscillator comprising a transformer having two coils 91 and 92, a condenser 93, transistor 94 and resistor 95. Battery 80 is connected to the blocking oscillator circuit and serves as its power source. Control signal A is applied to the circuit as the base biasing voltage of transistor 94. When the potential level of the signal is greater than approximately 1 v, the blocking oscillator beings oscillating and a high pulsed voltage is produced at the collector of transistor 94. When the potential level of the signal drops below approximately 0.4 v, the oscillator stops oscillating and no pulsed voltage is generated. At his time the amount of battery power consumed by the booster circuit is substantially zero.

The high pulsed voltage which is produced at the collector of transistor 94 is applied across rectifier 84 and charges the EL sheet 86. Since the rectifier is a diode, the charge stored in the EL sheet will not flow back to the booster circuit 82; instead, the EL sheet can only be discharged by way of discharge circuit 88. The discharge circuit is constructed by the proper arrangement of resistors 96, 98 and transistor 97. Control signal B is applied to the circuit as the base input to the transistor 97 and renders the transistor conductive when at a potential level of approximately 1 v, or more, the charge stored in the EL sheet being allowed to discharge through resistor 96. The transistor 97 is in a non-conductive state when the potential level of control signal B is approximately 0.4 v or less. When the transistor is conductive, resistor 96 serves to regulate the flow of electric current from battery 80 through coil 91 of booster circuit 82 and through rectifier 84.

For a case in which control signals A and B possess the voltage characteristics represented by the respective pulse trains of FIGS. 21(a) and 21(b), EL sheet 86 is charged when the potential of control signal A is 1.5 v and discharged when the potential of control signal B is 1.5 v. Thus, there is a repeating charge and discharge cycle so that the voltage which appears at the terminals of EL sheet a is the DC pulse train illustrated in FIG. 21(c). Accordingly, EL sheet 86 will emit light providing that the peak value of the voltage is sufficiently large and that the frequency is suitable.

FIG. 22 is a modified form of an EL sheet driving circuit shown in FIG. 20. Only the design of the booster circuit is different from that of FIG. 20, the remaining structure of the driving circuit being unchanged. Booster circuit 82' in the embodiment of FIG. 22 is constructed of a coil 100, transistor 102 and a biase resistor 104 of a transistor 102. Control signal A is comprised of a group of DC pulses as shown in FIG. 23 and is applied to the base of transistor 102 as a drive signal which turns the transistor on and off at a high frequency. This action sharply varies the flow of current through coil 100 so that high voltage pulses are generated at the collector of transistor 102. When the potential revel of control signal A is less than 0.4 v, transistor 102 is non-conductive and booster circuit 82' ceases operation. The high output voltage of the booster circuit charges EL sheet 86 through rectifier 84. The EL sheet is discharged by discharge circuit 88 responsive to control signal B in a manner as was described with reference to the circuit of FIG. 20.

In the EL sheet driving circuit of the present invention as described above, the control signal A which governs the boosting operation of the booster circuit and the control signal B which governs the discharge operation of the discharge circuit play important roles. During normal operation, i.e., when the EL sheet is not emitting light, the control signals must consume as little power as possible. In the case of the circuits shown in FIGS. 20 and 22, it is necessary that the potential level of both signals be zero at such time. Accordingly, when the EL sheet is to be rendered light emissive, it is arranged so that the two signals are activated only through the operation of a control member which is externally located on the watchcase. A control signal generator must not only be capable of producing a periodic pulsed waveform but must also be capable of meeting all the previously mentioned requirements. Although such a control signal generator can be expected to require a fairly complex structure, a suitable generator which is small in size and low in cost can be obtained by designing it into the integrated circuitry which constitutes the timekeeping circuits of the timepiece mechanism.

FIG. 24 is a cross-sectional view of a composite cell formed by integrating the LC cell 110 and an EL cell 112. Composite cell 108 comprises an LC cell 110 which is constituted by an upper glass plate 114, lower glass plate 116, twist nematic liquid crystal 118, seal 120, upper polarizing plate 122, and lower polarizing plate 124, and an EL cell 112 disposed below the LC cell 110 and integrated with it.

EL cell 112 includes a glass substrate 22 the upper surface of which defines a surface for diffused reflection, and a transparent upper electrode 128 disposed below the lower surface of glass substrate 126. Reference numeral 130 denotes an insulating substrate fabricated from a caramic or glass, a printing or vapor deposition technique being employed to form a lower electrode 132 on the upper surface of the substrate and a shielding electrode on its lower surface. Further, an insulating film 134 such as barium titanate and an EL material 136 are applied to the upper surface of the lower electrode and form a laminated structure. Lower electrode 132 is formed to include a connecting electrode 132a which protrudes from the lower surface of electrode 132 via a through-hole 130a located in the substrate 130. Upper electrode 128 is electrically connected to shielding plate or electrode 138 by way of electrically conductive connecting member 140. After upper glass substrate 126 and insulating substrate 130 are adhered into place, they are laminated into position from below the lower surface of the LC cell 110. Finally, the entire outer periphery of the laminated structure is enclosed within a moisture proof seal 142.

When a voltage is applied to connecting electrode 111 formed at the edge of upper glass plate 114 of the composite cell 108 as described, the display of LC cell 110 is rendered operative. The application of a high AC voltage across connecting electrode 132a of lower electrode 132 and shielding electrode 138 gives rise to an alternating, electric field between upper electrode 128 and lower electrode 132, thereby driving the EL cell 112.

FIG. 25 is a wiring diagram representative of driver circuit for the EL cell 112 of FIG. 24. Battery 150 supplies electric power to a timepiece circuit 152 and to an EL cell driving circuit. The driving circuit includes a step-up transformer 156 having three coils L1, L2, L3, a driving transistor 158, a biasing resistor 160, and a coupling condenser 162. Reference numeral 154 designates an EL cell lighting switch which is controlled by an external control member. An EL cell driver circuit constructed by transistor 158, resistor 160, condenser 162 and transformer 156 defines a collector tuned back coupled oscillator in which EL cell 112 serves as a collector tuned condenser. Coils L1, L2, L3 of transformer 156 are all wound in the same direction starting at the terminals indicated by the black dots. If the number of windings of coil L3 is made sufficiently larger than that of coils L1, L2 (10:1000), the collector tuned circuit will produce a high AC voltage which excites EL cell 112 into a light emissive state. The high voltage alternating electric filed can be prevented from leaking to the outside by the electrode arrangement of EL cell 112 shown in FIG. 24, namely by interposing the lower electrode 132 between the upper electrode 128 and shielding electrode 138 that are tied together and then connected to the ground terminal of battery 150.

FIGS. 26 and 27 are modified forms of the composite cell in accordance with the invention. In the composite cell 108' shown in FIG. 26, connecting electrodes are formed by leading lower electrode 132 and shielding electrode 138 to the edge of upper glass plate 114 by means of electrically conductive connecting members 170, 172. This allows the external connections of the LC cell and EL cell to be obtained from the same surface.

In the composite cell 180" of FIG. 27, glass substrate 22 can be eliminated and the thickness of the cell reduced by forming the upper electrode 128 of the EL cell directly on the lower surface of lower polarizing plate 124 of the LC cell 110. It is also possible to eliminate the electrically conductive connecting member 140, and effect connection of shielding electrode 138 by extending a portion of lower polarizing plate 124 which includes an electrically conductive film.

FIG. 28 is a cross-sectional view of another preferred embodiment of an EL sheet in accordance with the invention. The EL sheet 200 possesses a laminated structure formed by superposing, in order from the top of the drawing, a transparent 1st electrode plate 202, an electro-luminescent material 204, an insulator 206, a 2nd transparent electrode plate 208, an insulator 210 and a 3rd transparent electrode plate 212 which serves as a shield plate. Normally, this laminated structure includes a transparent material 214 such as glass or a transparent plastic disposed over its upper surface, as well as a sealing material 216 provided about the periphery of the structure in order to render it moisture-proof.

The 1st electrode 202 may be formed from a metallic film such as aluminum which is subjected to an etching process to produce a mesh-like pattern, or it may consist of a transparent electrically conductive material such as indium oxide or zinc oxide. The 2nd electrode plate 208 and 3rd electrode plate 212 are made of metal and are obtained by forming a thin film by means of a vapor deposition process, by the suitable adherence of a thin layer of metal. The EL material 204 consists of zinc sulfide admixed with a small amount of metal (such as copper or manganese), a suitable binder being added to the powderized material which is then applied to a substrate or formed by means of vapor deposition so as to produce a thin film. Insulator 206 is a thin film formed by a coating of barium titanate or by a vapor deposited layer of silicon dioxide. When making use of a transparent material such as silicon dioxide, the insulator 206 may be formed on both surfaces of the EL material 204. The insulator 210 interposed between the 2nd electrode plate 208 and 3rd electrode plate 312 is a polyester film or another dielectric which should be sufficiently thicker than insulator 206 and possess a smaller dielectric constant. The 1st electrode plate 202 and 3rd electrode plate 212 are electrically connected and constitute a single EL sheet electrode embracing the 2nd electrode plate 208. When the entire structure is installed within a timepiece, the 1st and 3rd electrode plates are connected to a portion of the time-keeping circuitry so that the electric potential which appears at the upper and lower surface of the EL sheet is substantially equal to that of the time-keeping circuitry. Accordingly, the application of an AC voltage across the electrically connected 1st and 3rd electrode plates and lead 218 of the 2nd electrode plate 208 causes the EL sheet to emit light but does not give rise to an electric field that will interfere with the operation of the field sensitive elements of the time-keeping circuitry adjacent the EL sheet.

FIG. 29 is a block diagram showing an embodiment of EL sheet driver circuit for a case in which an EL sheet of FIG. 28 accordance with the invention is installed in a timepiece. In the drawing, EL sheet 200 is provided with a common electrode 220 connected to outermost electrode plates 202 and 212 disposed on either side of the EL sheet, and with an electrode 222 connected to electrode plate 208 which is interposed between electrode plates 202 and 212. EL sheet driver circuit includes a transformer having three coils 224, 226, 228, a transistor 230 and its DC biasing resistor 232, and an AC feedback condenser 234, these components forming a back coupled oscillator in which the EL sheet 200 serves as a tuning condenser. The circuit thus constituted is connected through switch 236 to battery 11 which also supplies power to the time-keeping circuit 238. If the number of windings of transformer coil 228 is made sufficiently larger than that of the other two coils, the DC voltage supplied by battery 238 through switch 236 can be converted to a high AC voltage and applied to the terminals 220, 222 of the EL sheet. Since common electrode 220 connected to the outermost electrode plates on either side of EL sheet 200 is also connected through transformer coil 224 to one terminal of the power source of timepiece circuit 240, the potential surrounding EL sheet 200 is substantially equal to that of circuit 240. Accordingly, a disruptive electric field is not impressed upon the field sensitive components of the time-keeping circuitry.

FIG. 30 shows a modification of the EL sheet shown in FIG. 28, with like parts bearing like reference numerals as those used in FIG. 28. In this modification, the 3rd electrode 212 and insulator 210 are provided with a through-hole 242 so that the lower surface of 2nd electrode 208 is exposed. One end of a resilient contact member 244 is inserted into the hole 242 and brought into pressured contact with the lower surface of the 2nd electrode 208, while the other end of the contract member is connected to terminal 222 of the EL sheet driver circuit (see FIG. 29). At the same time, one end of a resilient contact member 246 is brought into pressured contact with the lower surface of the 3rd electrode plate 212, while the other end of the contact member is connected to terminal 220 of the EL sheet driver circuit (see FIG. 29). The contact members 244, 246 are electrically conductive as well as resilient and can be fabricated from a metallic coil or leaf spring or from an electrically conductive rubber. Impressing a driving voltage upon the EL sheet through the intermediary of these conductive contact members makes it possible to dispense with soldering operations. There is also no problem associated with slack in lead wires.

FIG. 31 is a cross-sectional view of a wristwatch in which the EL sheet of FIG. 30 is employed as the light source of an illumination device. Reference numeral 250 denotes a liquid crystal display device which employs twist nematic crystals and is driven by timepiece circuit 240 supplied with electrical power by battery 238. Reference numeral 200' denotes an EL sheet having the electrode structure as shown in FIG. 30. The EL sheet, through the intermediary of the two resilient contact members 244, 246, is electrically connected to the two terminals on the upper surface of EL sheet driver circuit 219 supplied with electrical power by battery 238. Moreover, the outermost electrode plates of the EL sheet are connected to a portion of timepiece circuit 240 through contact member 246 in pressured contact with the lower of these two connected electrodes, and through EL sheet driver circuit 240. Reference numeral 252 indicates a glass supported by a watch case 254, to which a back cover 256 is secured.

FIG. 32 shows a wiring diagram of another preferred example of an EL sheet driving circuit in accordance with the invention. A transformer having three coils 260, 262, 264, a transistor 266 and its DC biasing resistor 268, and an AC feedback condenser 270 constitute a collector tuned back coupled oscillator in which the EL sheet 272 serves as the tuning capacitor, the circuit thus constructed being connected to battery 274 through switch 276. The three coils 260, 262, 264 are all wound in the same direction, the beginning end of each winding being indicated by the black dots in the drawing.

If we let L1, L2 represent the respective inductances of coils 260, 262, and if $C_e$ is taken as the equivalent capacitance of EL sheet 272, the oscillating frequency F of the circuit will be given by $$F = \frac{1}{2\pi \sqrt{C_E(L1 + L2)}}.$$

Furthermore, if E is the battery output voltage, N1, N2 the respective number of windings of coils 260, 262, and if the base biasing voltage of the transistor is sufficiently large and the core of the transformer unsaturated, then the AC voltage produced by the tuned circuit is $$V_{EL} = 2 E (1 + \frac{N2}{N1}).$$

Thus, if the battery voltage is 1.5 v DC, an AC voltage of 300 v(P−P) can be obtained across the electrodes of the EL sheet if the coil turn ratio (N2/N1) is 1000. Even if error factors are introduced as a result of the resistance offered by coils 260, 262, the energy loss due to light emitted by the EL sheet, the collector-emitter saturation voltage of transistor 266 and the energy dissipated in feedback coil 264, it is still possible to obtain, with a rather high accuracy, the frequency and voltage represented by the above-mentioned equations.

FIGS. 33 and 34 depict modified forms of an EL sheet driver circuit in which the components shown in FIG. 32 are used to construct a base tuned back coupled oscillator. Although there is a small difference between the circuits of FIG. 33 and FIG. 34 with regard to transistor biasing, there is no difference in their ability to boost the battery voltage. If the number of windings and the inductance of transformer coil 264 are represented by N3 and L3, respectively, the frequency F and voltage $V_{EL}$ of the AC voltage impressed upon EL sheet 272 in this particular circuit are given by the respective equations $$F = \frac{1}{2\pi \sqrt{C_E(L2 + L3)}}$$

and $V_{EL} = \sqrt{2} \, E (1 + \frac{N2 + N3}{N1})$.

Here, $C_E$ is the equivalent capacitance of the EL sheet, E is the battery voltage, L2 is the inductance of coil 260, and N1, N2 are the number of windings of coils 260, 262, respectively.

FIG. 35 is still another modification of the circuit shown in FIG. 32 and depicts a wiring diagram of a back coupled oscillator in which coil 262 and EL sheet 272 form an inductively coupled resonance circuit.

When installing an EL sheet driver circuit of the type described in a timepiece, reducing the size of the transformer is a problem. This is particularly the case with regard to a wristwatch where the permissible transformer thickness may not exceed 4 mm due to limitations upon the thickness of the wristwatch itself. Although the electrostatic capacity of the EL sheet is proportional to the area of its light emitting surface, the capacity has a value between 150 and 200 PF since the area of the light emitting surface from 2 to 3 cm$^2$ in order to provide the required illumination of the timepiece display.

When employing an EL sheet having the electrostatic capacity of the above-mentioned magnitude, the most suitable transformer for use in the El sheet driving circuit can be constructed from a pot-type magnetic core having a thickness of from 3 to 4.5 mm, a diameter of from 5.3 to 7.5 mm, and a thickness-to-diameter ratio of 1:1.75, the core being coaxially wound with 20 to 30 μm of polyurethane wire.

In accordance with the EL sheet driver circuit as described above, it is possible to convert the battery voltage to a high AC voltage. Moreover, since the driver circuit can be constructed from a small number of relatively inexpensive, readily available components, illumination from a planar light source can be obtained without greatly raising the cost of the overall timepiece. Finally, the utilization of an EL sheet as the source of illumination greatly enhances the commercial value of the timepiece since an EL sheet capable of producing light of different colors can be adopted.

What is claimed is:

1. In an electro-luminescent device in which an alternating electric field is impressed upon an electro-luminescent material thereby to render it light emissive, the improvement comprising:
    a transparent 1st electrode plate disposed at the upper surface of the electro-luminescent material;
    a 2nd electrode plate disposed at the lower surface of the electro-luminescent material, and
    a 3rd electrode plate disposed opposite the 2nd electrode plate through the intermediary of an insulator, the 1st and 3rd electrode plates being electrically connected to serve as one electrode of a pair, the 2nd electrode plate serving as the outer electrode of the pair.

2. An illumination device for an electronic timepiece having a power source, a timepiece circuit connected to the power source to provide time information signals, and an electro-optical display device to display time information in response to said time information signals, comprising:
    an electro-luminescent sheet composed of a transparent plate facing the lower surface of said electro-optical display device, a conducting plate spaced apart from said transparent plate, a transparent electrode secured to the lower surface of said transparent plate, an insulating layer formed on the upper surface of said conducting plate, an electro-luminescent material filled in a space between said transparent electrode and said insulating layer, and a seal disposed between said transparent plate and said conducting plate to provide sealing therebetween, said electro-luminescent sheet being disposed adjacent to the lower surface of said electro-optical display device;
    a driver circuit including a booster circuit connected to said power source for converting an output voltage of said power source to a high voltage; and
    an illumination switch connected between said power source and said booster circuit for being actuated to operate said booster circuit;
    said high voltage from said booster circuit being applied between said metallic sheet and said transparent electrode of the electro-luminescent sheet when said illumination switch is actuated, to cause said electro-luminescent sheet to become light-emissive, whereby said electro-optical display device is illuminated by light transmitted therethrough from said electro-luminescent sheet.

3. An illumination device according to claim 2, in which said electro-optical device comprises a liquid crystal display device.

4. An illumination device according to claim 2, in which said timepiece circuit is mounted on a circuit substrate, and further comprising a shielding plate disposed between said circuit substrate and said electro-luminescent sheet.

5. An illumination device according to claim 4, in which said shielding plate and said transparent electrode are electrically connected to serve as one electrode of a pair.

6. An illumination device according to claim 5, in which said shielding plate is connected to a ground terminal of said electronic timepiece.

7. An illumination device according to claim 2, in which said driver circuit further includes a control signal generator for generating a control signal, and a switching circuit connected between said booster circuit and said electro-luminescent sheet for applying said high voltage to said electro-luminescent sheet intermittently at a low frequency in response to said control signal.

8. An illumination device according to claim 7, in which said switching circuit comprises a plurality of bipolar transistors.

9. An illumination device according to claim 7, in which said switching circuit comprises said timepiece circuit.

10. An illumination device according to claim 7, in which said low frequency has a value selected from among 32 Hz, 64 Hz, 128 Hz and 256 Hz.

11. An illumination device according to claim 2, in which said driver circuir further includes rectification means for providing a charging voltage to charge said electro-luminescent sheet by rectifying said high voltage, and a discharging circuit for discharging the charge stored in said electro-luminescent sheet.

12. An illumination device according to claim 11, in which said rectification means comprises a rectifying diode and a filter condenser.

13. An illumination device according to claim 11, in which said booster circuit and said discharging circuit are rendered operative in an alternating manner.

14. An illumination device according to claim 11, in which said filter condenser comprises said electro-luminescent sheet.

15. An illumination device according to claim 2, in which said electro-optical display device and said electro-luminescent sheet are integrated into a single structure.

16. An illumination device according to claim 15, in which external connecting electrodes of said electro-optical display device and said electro-luminescent sheet are provided on the same surface of said electro-optical display device.

17. An illumination device according to claim 4, in which said shielding plate is integrated with said electro-luminescent sheet.

18. An illumination device according to claim 17, in which said conductive plate and said shielding plate are connected to said driver circuit by means of electrically conductive, resilient members.

19. An illumination device according to claim 2, in which said booster circuit comprises a back coupled oscillator with said electro-luminescent sheet serving as a tuning condenser therein, the voltage from said power source being impressed upon said back coupled oscillator when said illumination switch is actuated, whereby said back coupled oscillator generates a high AC voltage which is applied to said electro-luminescent sheet whereby said electro-luminescent sheet is rendered light emissive.

* * * * *